F. LOOS.
SAFETY SUSPENDING DEVICE FOR LIFT CAGES.
APPLICATION FILED AUG. 28, 1911.

1,010,281. Patented Nov. 28, 1911.

Witnesses:

Inventor:
Frank Loos.

UNITED STATES PATENT OFFICE.

FRANZ LOOS, OF OTTOWITZ, NEAR CARLSBAD, AUSTRIA-HUNGARY, ASSIGNOR TO CAMILL SCHWALB, OF CARLSBAD, AUSTRIA-HUNGARY.

SAFETY SUSPENDING DEVICE FOR LIFT-CAGES.

1,010,281.      Specification of Letters Patent.      Patented Nov. 28, 1911.

Application filed August 28, 1911. Serial No. 646,373.

*To all whom it may concern:*

Be it known that I, FRANZ LOOS, a subject of the Emperor of Austria-Hungary, and resident of Ottowitz, near Carlsbad, Bohemia, Austria-Hungary, have invented certain Improvements in Safety Suspending Devices for Lift-Cages, of which the following is a specification.

It is known to arrange the cage of a lift in a frame work in which it can be vertically displaced, said frame work, which is normally supported on the cage and guides the latter on the guide-beams, being provided above and below the cage with catches adapted, in case the hoisting cable breaks, to successively grip the guide-beams and retain the cage on the latter.

The present invention relates to a device of this kind and consists in the construction and arrangement, as hereinafter described and claimed, of the means whereby the catches are operated, the object of the invention being to insure a gradual stopping of the cage and so to obviate shocks.

Figure 1:
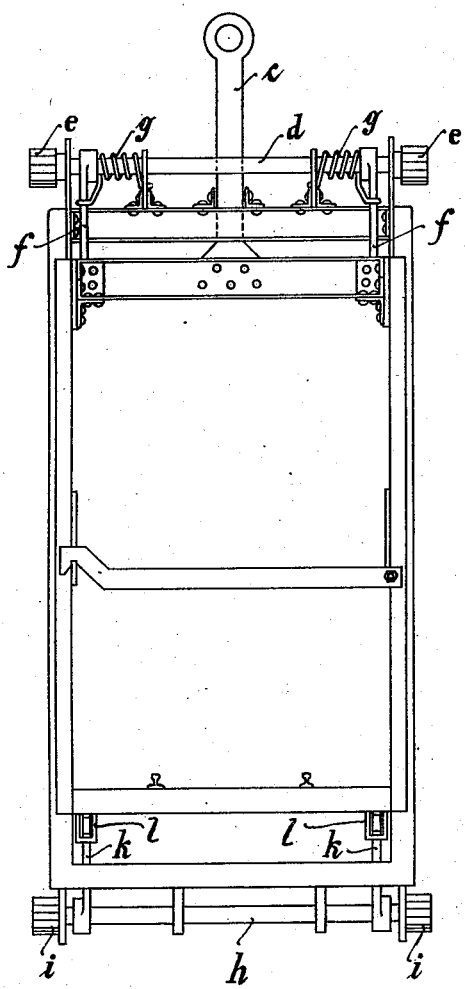
Figure 2:
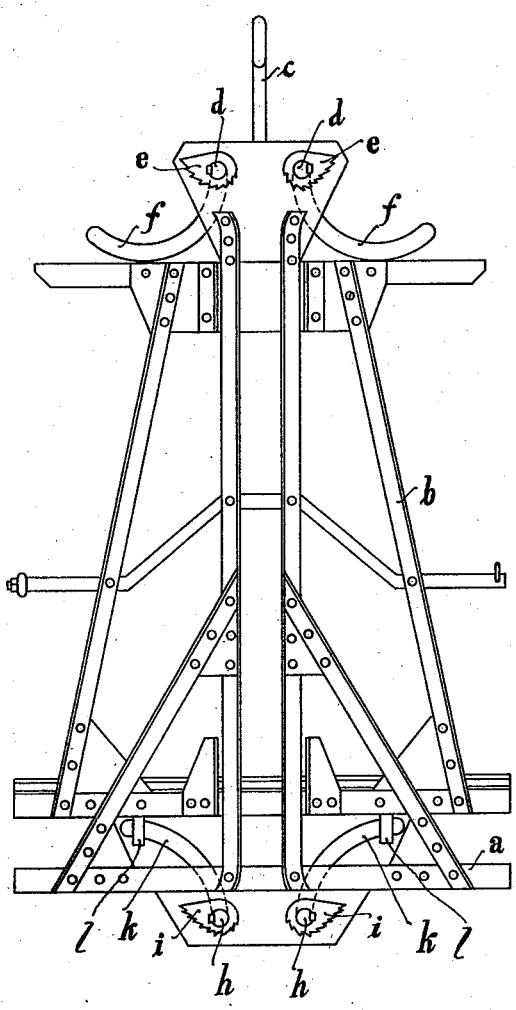

In the accompanying drawings the invention is illustrated, Figure 1 representing a front view, and Fig. 2, a side view of the improved arrangement.

The cage $b$ is fitted and guided in known manner in a frame work $a$ so as to admit of vertical adjustment in the same. The hoisting cable is connected by means of a hooked or eyed arm $c$ to the cage $b$. Above the cage $b$ two shafts $d$ are provided which are rotatably held in the frame work $a$ so as to have their ends disposed at opposite sides of the beams on which the lift is guided by means of the frame. Catches in the form of cams $e$ are provided on the ends of the shafts which catches are adapted, in one position, to grip the beams so as to hold the frame and cage suspended on the latter. Normally the frame work is supported on the cage, and the cams $e$ are held out of engagement with the guide-beams by means of curved arms $f$ mounted on the shafts $d$ and resting on some element of the cage, for instance the top cover. Springs $g$ abut against the arms $f$ and tend to turn them so as to apply the cams $e$ to the guide-beams. Underneath the cage, shafts $h$ and cams $i$ are mounted in the frame work in a similar manner, the curved controlling arms $k$ being here directed upward and guided loosely in eyes $l$ connected to the cage.

The *modus operandi* is as follows: If the hoisting cable should break, the frame work $a$, owing to its engagement with the guide-beams, will be slower than the cage $b$ in descending. The relative movement of the cage and frame work reacts upon the arms $f$ and $k$ so as to turn the cams into engagement with the guide-beams and fix the frame work with the cage thereon. The arrangement is such that the cams $e$ are first applied to the beams so as to retard the movement, the braking effect being then gradually increased, until the movement is stopped, by the application to the beams of the cams $i$. Finally the arms $f$ are set perfectly free so that, actuated by the springs $g$, they can apply the cams $e$ completely to the beams for fixing the frame and the cage to the latter. In this manner the stopping of the lift is effected entirely without shocks. When, after the hoisting cable has been repaired or renewed, the cage is lifted, a displacement of the same takes place in the reverse direction. This causes first a release of the cams $i$ from the guide-beams, the arms $f$ being next engaged by the cage and turned, in opposition to the springs $g$, so as to release the cams $e$ as well. A gradual and jerkless loosening of the lift is thus effected.

I claim:

In a safety suspending device for lift cages of the character described, the combination with a frame work which is normally supported on the cage and which guides the latter on the guide-beams, the cage admitting of vertical displacement in the frame, of shafts mounted in the frame above and below the cage so as to have their ends disposed at opposite sides of the guide-beams, cams fitted on the ends of the shafts so as to admit of being applied to the beams when the shafts are turned, curved arms on the upper shafts normally supported on the cage so as to hold the cams in inoperative position, springs acting on said arms and tending to turn the cams into operative position, and curved arms on the lower shafts loosely guided in eyes on the cage so as to hold the cams of said shafts normally in inoperative position, the arrangements being such that, when the cage is displaced in the frame owing to the breaking of the hoisting cable, the upper arms are turned by the springs and the lower arms by the cage for applying the cams to the guide-beams and fixing the lift to the latter, the upper cams being first applied to the beams and then the lower ones, substantially as and for the purpose set forth.

FRANZ LOOS.

Witnesses:
ROBERT C. BOESEL,
OSKAR GOLDMANN.

Copies of this patent may be obtained for five cents each, by addressing the "Commissioner of Patents, Washington, D. C."